United States Patent
Russell

(10) Patent No.: US 8,314,603 B2
(45) Date of Patent: Nov. 20, 2012

(54) NETWORK CABLE WITH TRACER OPTICAL WAVEGUIDE

(75) Inventor: John B. Russell, San Jose, CA (US)

(73) Assignee: Realm Communications Group, Inc., Milpitas, CA (US)

( * ) Notice: Subject to any disclaimer, the term of this patent is extended or adjusted under 35 U.S.C. 154(b) by 97 days.

(21) Appl. No.: 12/851,009

(22) Filed: Aug. 5, 2010

(65) Prior Publication Data

US 2011/0034068 A1 Feb. 10, 2011

Related U.S. Application Data

(60) Provisional application No. 61/231,632, filed on Aug. 5, 2009.

(51) Int. Cl.
*G01R 19/00* (2006.01)
(52) U.S. Cl. ........... 324/66; 324/542; 439/502; 439/489
(58) Field of Classification Search .................. 439/502, 439/489; 324/66, 542
See application file for complete search history.

(56) References Cited

U.S. PATENT DOCUMENTS

| 5,305,405 A * | 4/1994 | Emmons et al. ................ 385/73 |
| 6,530,085 B1 * | 3/2003 | Perlman .......................... 725/82 |
| 6,906,505 B2 * | 6/2005 | Brunet et al. ................... 324/66 |
| 7,524,082 B2 | 4/2009 | North |

OTHER PUBLICATIONS

Web page http://www.patchsee.com/en/sommaire_fr.php3, by Patchsee (TM), downloaded Aug. 5, 2010.
Web page http://www.patchsee.com/en/article.php3?id_article=11, by Patchsee (TM), downloaded Aug. 5, 2010.
Web page http://www.patchsee.com/en/article.php3?id_article=5#, by Patchsee (TM), downloaded Aug. 5, 2009.

* cited by examiner

*Primary Examiner* — Truc Nguyen
(74) *Attorney, Agent, or Firm* — Silicon Valley Patent Group LLP

(57) ABSTRACT

A network cable includes a data cable with cable connectors at opposing ends. A tracer optical waveguide is connected to the data cable, e.g., within the same jacket or by connectors such as heat shrink tubing. The ends of the tracer optical waveguide are physically separate from corresponding ends of the optical waveguide, e.g., the ends of the tracer optical waveguide furcate from the data cable. In use, a light signal is introduced into one end of the tracer optical waveguide, e.g., by Visual Fault Locator, and the light signal is emitted and can be observed from the opposing end, thereby identifying corresponding ends of the tracer optical waveguide, and thus, opposing ends of the connected data cable.

22 Claims, 2 Drawing Sheets

NETWORK CABLE WITH TRACER OPTICAL WAVEGUIDE

CROSS REFERENCE TO RELATED APPLICATIONS

This application claims the benefit of Provisional Application No. 61/231,632, filed Aug. 5, 2009, which is hereby expressly incorporated by reference herein.

BACKGROUND

Networks commonly include two or more computers, communication equipment, and related devices, or similar systems, which are coupled together using network cables. Network cables typically include one or more conductive cables, such as copper wires, or waveguides, such as optical fibers, with cable connectors disposed at the ends. The cable connectors are used to plug the end of a waveguide into a computer, communication equipment, patch panel or other similar device. In many cable routing environments there are many identically appearing network cables. For example, in common fiber optic distribution centers there may be dozens or hundreds of identical cables. It is sometimes necessary to identify corresponding ends of cable, which is difficult when many identical cables are present.

Identification of corresponding ends of a cable is rendered even more difficult when the cables are in service and, thus, cannot be unplugged from the patch panel. One method used to identify corresponding ends of a cable uses light emitters, such as light emitting diodes, that are spaced apart along the length of the cable and are connected together with electrically conductive lines. When a potential is applied to the conductive lines, the light emitters along the cable are activated. One such cable with light emitters is disclosed in U.S. Pat. No. 7,524,082 by North. One problem with the use of light emitters along the length of the cable is that the conductive traces may fail. The user may waste time attempting to locate an activated light emitter before realizing that the conductive trace has failed. Also, in some application, the presence of an electrical conductor along the cable may be disadvantageous.

Accordingly, an improved network cable is desirable.

SUMMARY

A optical network cable includes one or more data cables with cable connectors at opposing ends. A tracer optical waveguide is connected to the data cables, e.g., within the same jacket or by connectors such as heat shrink tubing. The ends of the tracer optical waveguide are separate from corresponding ends of the optical waveguide, e.g., the ends of the tracer optical waveguide furcate from the data cable. The ends of the tracer optical waveguide may be located along the length of the data cable, e.g., the tracer optical waveguide may be shorter than the data cable. In use, a light signal is introduced into one end of the tracer optical waveguide, e.g., by Visual Fault Locator, and the light signal is emitted and can be observed from the opposing end, thereby identifying corresponding ends of the tracer optical waveguide. Accordingly, corresponding ends of the connected data cable can be identified without unplugging the data cables.

DETAILED DESCRIPTION

Figure 1:
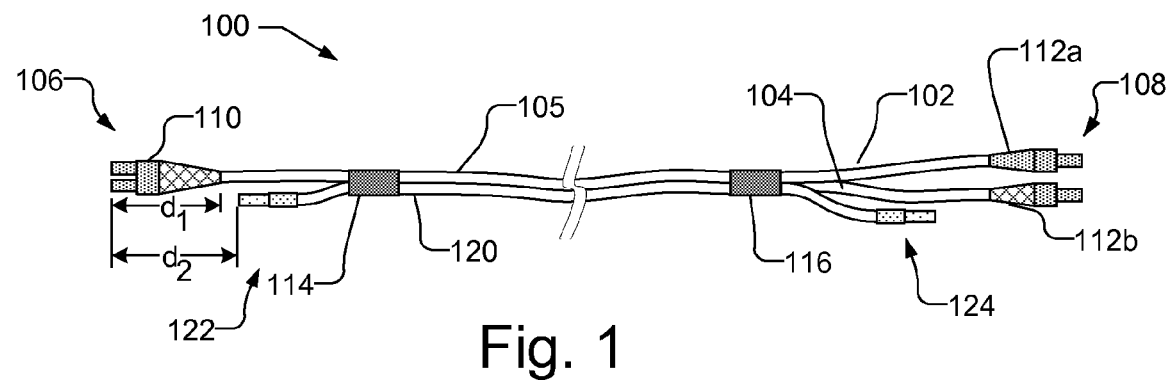
FIG. 1 illustrates a side view of a network cable with a tracer optical waveguide.

FIG. 1 illustrates a side view of one embodiment of a network cable 100 with a tracer optical waveguide 120. In one embodiment, the network cable 100 may be an Optical Fiber Nonconductive Riser (OFNR). The network cable 100 is illustrated as including two data cables 102 and 104, which have opposing ends 106 and 108. Cable connectors 110 and 112a and 112b are coupled to the opposing ends 106 and 108, respectively. The data cables 102 and 104 may be conductive cables, such as found in Cat5 or other such cables, or may be optical waveguides, such as optical fiber. By way of example, the data cables 102 and 104 may be any desired type of optical waveguide, including plastic or glass, and in one embodiment are a 600 µm buffered SMF-28e+ type optical fiber. Other optical waveguides may be used including 50 µm core, 62.5 µm core, 100 µm core, Polarization Maintaining, or Laser Optimized or OM3 fiber types. While two data cables 102 and 104 are illustrated in FIG. 1, it should be understood that additional or fewer data cables may be used in the network cable 100. The data cables 102 and 104 may be contained within a single jacket 105, which may be, e.g., 3 mm thick jacket, where the individual data cables 102 and 104 break out of the jacket near end 108.

As illustrated in FIG. 1, the cable connector 110 is a duplex type connector connected to both data cables 102 and 104 at one end 106, while separate cable connectors 112a and 112b are coupled to data cables 102 and 104, respectively, at the opposing end 108. If desired, single or duplex type connectors may be used at both of the opposing ends 106 and 108. Where the data cables 012 and 104 are optical waveguides, the cable connectors 110 and 112a, 112b may be standard fiber optic connectors, e.g., FC, SC, ST, LC, MTRJ or other type of connectors that permit the network cable 100 to be used in standard fiber optic jumper cable applications. The cable connectors 110 and 112 are illustrated as being different type of connectors, but they may be the same type if desired.

The network cable 100 includes a tracer optical waveguide 120 along with the data cables 102 and 104. The tracer optical waveguides 120 may be any desired waveguide, such as a fiber optic cable and may include a core that is plastic or glass. In one embodiment the tracer optical waveguide 120 may be 600 µm buffered SMF-28e+ type optical fiber. The tracer can be any optical waveguide fiber, including, but not limited to plastic, 50 um core, 62.5 um core, or 100 um core. FIG. 1 illustrates tracer optical waveguide 120 as coupled to data cables 102 and 104 by heat shrink tubes 114 and 116, however, other coupling mechanisms may be used. For example, in one embodiment, the tracer optical wave guide 120 may be located within the same jacket 105 as the data cables 102 and 104, or in the adjacent jacket of a duplex cable configuration.

The tracer optical waveguide 120 includes two opposing ends 122 and 124. In one embodiment, the end of the tracer optical waveguide 120 may be terminated by a cleaved, polished or formed end or terminated with a connector or ferrule. As illustrated, the ends 122 and 124 are located along the length of the optical waveguide 102 and 104 between the cable connectors 110 and 112a, 112b. The cable connectors 110 and 112a, 112b have a length, illustrated in FIG. 1 as distance $d_1$. The ends 122 and 124 of the tracer optical waveguide 120 is located a distance $d_2$ that is greater than the length of the cable connectors 110 and 112a, 112b away from the corresponding ends 106 and 108 of the data cables 102, 104. For example, cable connectors 110 and 112 and 112b, typically have a length of approximately 1 inch to 1.5 inches, while the end 122 of the tracer optical waveguide 120 may be greater than six inches, e.g., greater than 12 inches, from the end 106 of the data cables 102, 104.

The tracer optical waveguide 120 is not used for data transfer and thus may be manufactured to lower specifications than used for the data cables 102, 104. Nevertheless, light that is introduced into one end of the tracer optical waveguide 120 is emitted and easily observable from the other end of the tracer optical waveguide 120. Accordingly, to identify corresponding ends of the network cable, a user can introduce light into one end of the tracer optical waveguide 120, e.g., using a light source such as a flashlight or Visual Fault Locator, and can readily and easily identify the opposite end of the tracer optical waveguide 120 and, thus, the network cable 100 by the observable emitted light. Moreover, the tracer optical waveguide 120 can be bent anywhere along the length, particularly if it is composed of plastic, and the introduced light will be emitted from the bend. Thus, positive identification of the network cable is possible anywhere along the length of the network cable. Because the tracer optical waveguide 120 does not depend on electrically conductive traces, which sometimes fail, the tracer optical waveguide 120 is dependable and easily used and remains entirely dielectric.

Figure 2:
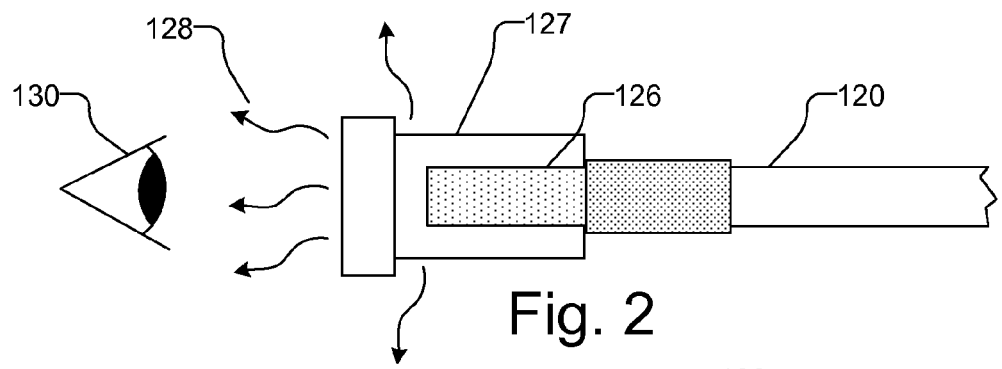
FIG. 2 illustrates one embodiment of an end of the tracer optical waveguide, in which a cap is connected to the end to disperse light.

FIG. 2 illustrates an end 122 of tracer optical waveguide 120. The tracer optical waveguide 120 may have the end melted to form a heat-formed ball lens or have a plain, polished or cleaved end. As illustrated in FIG. 2, the end 122 of the tracer optical waveguide 120 may be connected to a ferrule or a connector 126, such as a standard fiber optic cable connector. In one embodiment, a standard ST connector with the body shell removed may be used. Optionally, a cap 127 may be used with or in place of connector 126. The cap 127 may be friction-fit and readily removable, e.g., when connecting to a light source such as a Visual Fault Locator either directly or with a launch cable. The cap 127 is at least partially transparent and disperses exiting light 128 to be seen by an observer 130. For example, the cap 127 may be diffusing or may include internally reflective surfaces for redirecting light in a desired direction.

Figure 3:
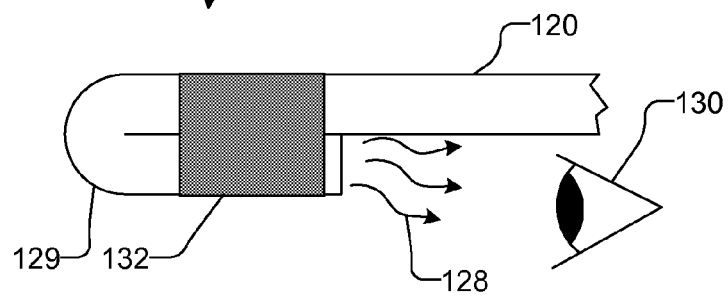
FIG. 3 illustrates another embodiment of an end of the tracer optical waveguide, in which the end of the tracer optical waveguide includes a bend of 180° from which light is dispersed.

In another embodiment illustrated in FIG. 3, the end 122 of tracer optical waveguide 120 has a bend 129 that is 180°. The bend 129 at the end 122 redirects the tracer optical waveguide 120 so that light that is emitted from the tracer optical waveguide 120 is dispersed in a direction that can be easily seen by an observer 130. The bend 129 may be held by, e.g., a heat shrink tube 132.

In one embodiment, the tracer optical waveguide 120 may be uni-directional. For example, the end 122 of the tracer optical waveguide 120 may be connected to an illumination device, e.g., such as a non-removable diffusing cap, that provides easily observable illumination, but is not connectable to a light source. The opposite end 124 of the tracer optical waveguide is configured to be connected to a light source, such as a Visual Fault Locator. If desired, two oppositely oriented uni-directional tracer optical waveguides may be used.

Referring back to FIG. 1, in one embodiment, the tracer optical waveguide 120 may be shorter than the data cables to which it is attached, i.e., data cables 102 and 104. For example, in one embodiment, the ends of the cable connectors 110 and 112a, 112b connected to the data cables 102 and 104 may extend 18 inches from the heat shrink tubes 114 and 116, while the ends of the tracer optical waveguide 120 may extend only 4 inches from the heat shrink tubes 114 and 116. Of course, other lengths may be used if desired. The use of a tracer optical waveguide 120 that is shorter than the attached data cables is useful to keep the tracer optical waveguide 120 out of the way when using network cable 100, e.g., plugging and unplugging the data cables 102 and 104 into network panels. The length of the tracer optical waveguide 120, however, should be long enough for the user to easily manipulate, e.g., to attach a light source to one end and examine the other end for emitted light.

In another embodiment, the tracer optical waveguide 120 may be the same length or longer than the data cables 102 and 104. By way of example, in one embodiment, the ends of the tracer optical waveguides 120 may be connected to the cable connectors for the data cables 102 and 104, where the cable connectors are configured to be illuminated by the light emitted from the tracer optical waveguide 120. In another embodiment, the tracer optical waveguide 120 may be connected to the panel on the computer or communication equipment and illuminate an indicator on the panel when light is emitted from the tracer optical waveguide.

Figure 4:
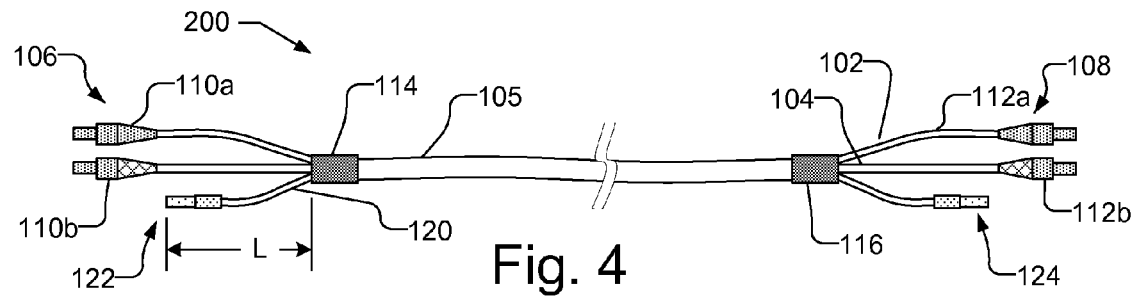
FIG. 4 illustrates a side view of another embodiment of a network cable with a tracer optical waveguide.

FIG. 4 illustrates a side view of another embodiment of a network cable 200 with a tracer optical waveguide 120. Network cable 200 is similar to network cable 100 shown in FIG. 1, like designed elements being the same. The network cable 200 is illustrated as including two cable connectors 110a and 110b at end 106. It should be understood that any desired cable connector may be used with the data cables 102 and 104 in the network cable 200. Moreover, network cable 200 illustrates the tracer optical waveguide 120 with the same jacket 105 as the data cables 102 and 104. As illustrated in FIG. 4, the tracer optical waveguide furcates from the jacket 105 and has a furcation length L of one inch or greater, e.g., four inches, between the end 122 of the tracer optical waveguide 120 and a location of furcation from the jacket 105. In one embodiment, the furcation length L may be approximately 0, e.g., where only the end 122 of the tracer optical waveguide 120 emerges from the jacket 105 or the tracer optical waveguide 120 lays on the jacket 105.

Figure 5:
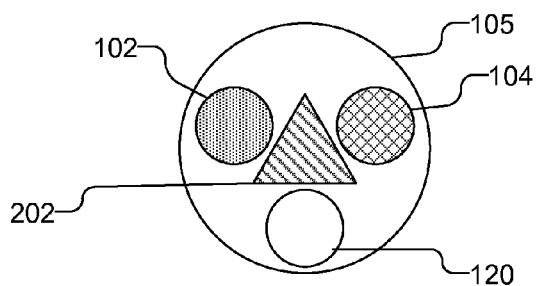
FIG. 5 is a cross-sectional view of the network cable from FIG. 4.

FIG. 5 is a cross-sectional view of network cable 200. As can be seen in FIG. 5, the data cables 102 and 104 and the tracer optical waveguide 120 are all contained within the jacket 105. Additionally, support fibers 202, such as aramid fibers (Kevlar®), or other strength material may be contained within the jacket 105, particularly if the data cables 102 and 104 are optical waveguides. It should be understood that additional components may be included within the jacket 105 and/or surrounding the cores of the data cables 102, 104 and the tracer optical waveguide 120, such as fiber coatings, thermoplastic overcoating/buffer, strength members and individual jackets.

Figure 6:
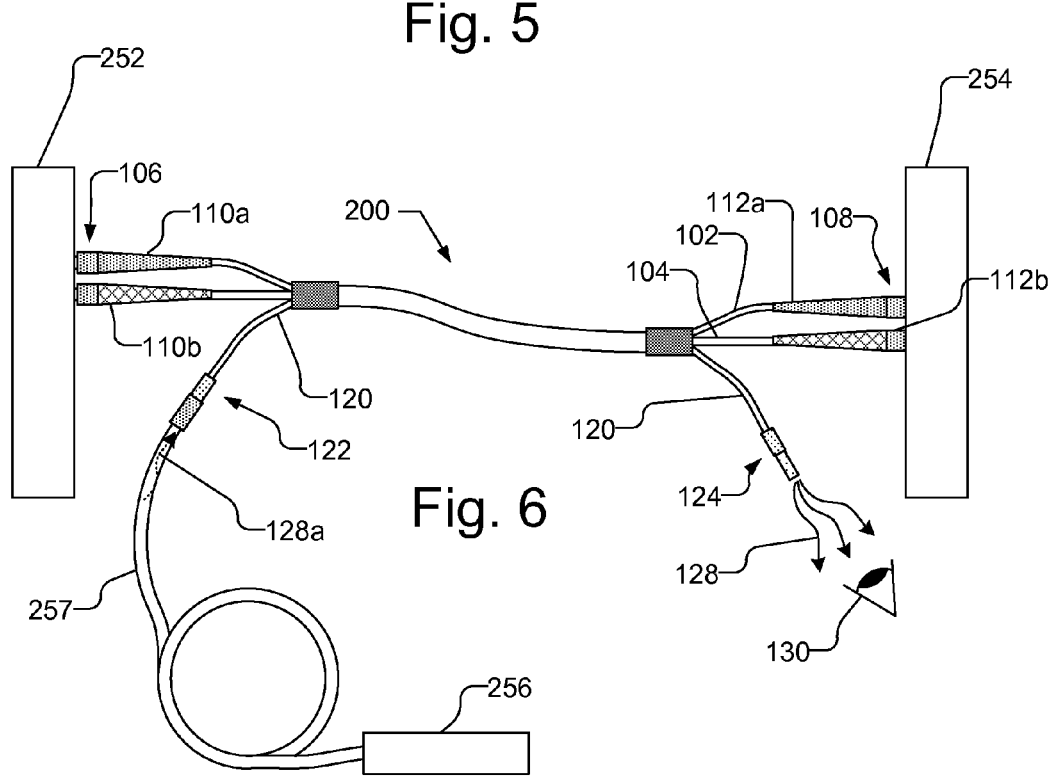
FIG. 6 illustrates the network cable attached to panels and the tracer optical waveguide in use to identify corresponding ends of the network cable.

FIG. 6 illustrates the network cable 200 from FIG. 4 in use. As illustrated, the data cables 102 and 104 at end 106 are connected to a panel 252 via cable connectors 110a and 110b, respectively, and at end 108 are connected to a panel 254 via cable connectors 112a and 112b. Although not shown in FIG. 6, typically, many network cables will be connected to the panels 252 and 254 making identification of corresponding ends of a single network cable difficult. Additionally, in a typical network, the panels 252 and 254 are often in different rooms and may be on different floors within the building, which makes physically following one end of a network cable to the other end of the network cable impossible. With the use of tracer optical waveguide 120, however, identifying corresponding ends of the network cable is greatly simplified. Moreover, because the ends 122, 124 of the tracer optical waveguide 120 are separate from the ends 108, 110 of the data cables 102, 104, the ends 122, 124 of the tracer optical waveguide 120 may be conveniently separated from the ends 108, 110 of the data cables 102, 104, e.g., held outside a patch panel cabinet, thereby simplifying identification of which patch panel the network cable 200 is connected. With the ends 122, 124 of the tracer optical waveguide 120 may be held outside a cabinet patch panel, the connected patch panel can be identified without opening the cabinet, thereby minimizing the disturbance of patch panels.

As illustrated in FIG. 6, a light source 256 is optically connected to one end 122 of the tracer optical waveguide 120, e.g., using a launch cable 257, to introduce a light signal 128a into the end 122. The light source 256 may be a flashlight, a Visual Fault Locator or other similar source of light. The light source 256 may be physically attached to the end 122 of the tracer optical waveguide 120 or simply held near the end 122 so that light is introduced into the end 122. At the other end 124 of the tracer optical waveguide 120, the light signal 128 is emitted and can be easily seen by an observer 130. Thus, the corresponding ends 122 and 124 of the tracer optical waveguide 120 are identified, and therefore the corresponding ends 106 and 108 of the data cables 102 and 104 of the network cable 100 are identified, without need for unplugging the data cables 102 and 104.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A network cable comprising:
   at least one data cable having opposing ends;
   cable connectors coupled to the opposing ends of the at least one data cable;
   a tracer optical waveguide coupled to the at least one data cable, the tracer optical waveguide having opposing ends that are physically separated from the cable connectors; and
   at least one of a connector and a ferrule connected to at least one of the opposing ends of the tracer optical waveguide and a removable cap that is at least partially transparent and is removably connected to the at least one of the connector and the ferrule, the removable cap disperses light that is exiting the tracer optical waveguide.

2. The network cable of claim 1, wherein the cable connectors having a length and the opposing ends of the tracer optical waveguide are located a distance greater than the length of the cable connectors from corresponding ends of the at least one data cable.

3. The network cable of claim 1, wherein the at least one data cable is one of an optical waveguide and a conductive cable.

4. The network cable of claim 1, wherein the tracer optical waveguide has a length that is shorter than a length of the at least one data cable.

5. The network cable of claim 1, wherein the opposing ends of the tracer optical waveguide are located more than six inches from corresponding ends of the at least one data cable.

6. The network cable of claim 1, wherein the tracer optical waveguide has a 180° bend located at least at one of the opposing ends.

7. The network cable of claim 1, further comprising a plurality of data cables having opposing ends coupled to the tracer optical waveguide.

8. The network cable of claim 7, wherein at least one of the cable connectors is a duplex connector, and two of the data cables one are coupled to the duplex connector.

9. The network cable of claim 1, wherein the tracer optical waveguide is one of plastic and glass.

10. The network cable of claim 1, further comprising a single jacket, wherein at least a portion of the optical waveguide and at least a portion of the tracer optical waveguide are held inside the single jacket.

11. The network cable of claim 10, wherein the tracer optical waveguide furcates from the single jacket.

12. The network cable of claim 11, wherein the tracer optical waveguide has a length of one inch or more after the furcation from the single jacket.

13. The network cable of claim 1, wherein the at least one data cable and the tracer optical waveguide are coupled together with heat shrink tubing.

14. A network cable comprising:
   a jacket;
   a data cable having a length and opposing ends with cable connectors coupled to the opposing ends, at least a portion of the data cable is held within the jacket;
   a tracer optical waveguide held within the jacket, the tracer optical waveguide having opposing ends that furcate from the jacket and that are separate from the cable connectors; and
   at least one of a connector and a ferrule connected to at least one of the opposing ends of the tracer optical waveguide and a removable cap that is at least partially transparent and is removably connected to the at least one of the connector and the ferrule, the removable cap disperses light that is exiting the tracer optical waveguide.

15. The network cable of claim 14, wherein the opposing ends of the tracer optical waveguide are located along the length of the data cable between the cable connectors.

16. The network cable of claim 14, wherein the data cable is one of an optical waveguide and a conductive cable.

17. The network cable of claim 14, wherein the tracer optical waveguide has a length that is shorter than the length of the data cable.

18. The network cable of claim 14, wherein the opposing ends of the tracer optical waveguide are located more than six inches from the corresponding ends of the data cable.

19. The network cable of claim 14, wherein the tracer optical waveguide has a 180° bend located at least at one of the opposing ends.

20. The network cable of claim 14, further comprising a plurality of data cables held within the jacket.

21. The network cable of claim 14, the tracer optical waveguide having a length of one inch or greater after the furcation from the jacket.

22. The network cable of claim 14, wherein the tracer optical waveguide is one of plastic and glass.

* * * * *